United States Patent
Torres Moreno et al.

(10) Patent No.: US 10,679,777 B2
(45) Date of Patent: Jun. 9, 2020

(54) SYSTEM CONFIGURED TO ASSEMBLE ONE OR MORE CABLES IN A LAYOUT

(71) Applicant: AIRBUS DEFENCE AND SPACE S.A., Madrid (ES)

(72) Inventors: Juan Torres Moreno, Linares (ES); Alberto Perez Barthelemy, Linares (ES); Josef Ignacio Hötz Ordoño, Getafe (ES); Tamara Ramos Santana, Getafe (ES); Jose Carlos Diaz Cruz, Getafe (ES)

(73) Assignee: AIRBUS DEFENCE AND SPACE S.A., Madrid (ES)

( * ) Notice: Subject to any disclaimer, the term of this patent is extended or adjusted under 35 U.S.C. 154(b) by 266 days.

(21) Appl. No.: 15/656,135

(22) Filed: Jul. 21, 2017

(65) Prior Publication Data
US 2018/0025814 A1    Jan. 25, 2018

(30) Foreign Application Priority Data

Jul. 22, 2016 (EP) ..................................... 16382361

(51) Int. Cl.
| | | |
|---|---|---|
| *B23P 19/00* | (2006.01) | |
| *H01B 13/012* | (2006.01) | |
| *G06F 30/15* | (2020.01) | |
| *G06F 113/16* | (2020.01) | |
| *B60R 16/02* | (2006.01) | |

(52) U.S. Cl.
CPC . *H01B 13/01236* (2013.01); *H01B 13/01209* (2013.01); *H01B 13/01227* (2013.01); *B60R 16/0207* (2013.01); *G06F 30/15* (2020.01); *G06F 2113/16* (2020.01)

(58) Field of Classification Search
CPC .......... B60R 16/0207; H01B 13/01209; H01B 13/01227; H01B 13/01236; G06F 17/5095
See application file for complete search history.

(56) References Cited

U.S. PATENT DOCUMENTS

| | | | | |
|---|---|---|---|---|
| 4,114,014 A | * | 9/1978 | Shogo | H01B 13/01245 219/56 |
| 4,194,276 A | * | 3/1980 | Grubb | H01R 43/015 269/909 |
| 4,593,452 A | | 6/1986 | Keahey et al. | |
| 4,677,734 A | | 7/1987 | Bloch et al. | |
| 5,153,839 A | * | 10/1992 | Cross | G05B 19/41835 29/33 M |
| 9,079,680 B2 | * | 7/2015 | Vannice | B65B 69/0025 |

(Continued)

OTHER PUBLICATIONS

Search Report for EP 16382361.0 dated Jan. 24, 2017, 9 pages.

*Primary Examiner* — Paul D Kim
(74) *Attorney, Agent, or Firm* — Nixon & Vanderhye P.C.

(57) ABSTRACT

A cable (1) assembly device for producing cabling including: a support surface (2) on which the cable assembly is carried out (1), cable (1) fastening and guide elements (3), said fastening and guide elements (3) comprising a vacuum element for joining it to said support surface (2), a feeder (4) of the cable to be assembled, a computation means that includes a cabling diagram in its memory and the location of the fastening and guide elements (3) on the support surface (2), a storage module (5) for cable (1) fastening and guide elements (3), positioning means (6) of the fastening and guide elements (3) on the support surface (2).

11 Claims, 6 Drawing Sheets

(56) References Cited

U.S. PATENT DOCUMENTS

| | | | |
|---|---|---|---|
| 9,293,899 B2* | 3/2016 | Rouleau | H02G 3/0443 |
| 2014/0290050 A1 | 10/2014 | Metche et al. | |
| 2016/0064121 A1 | 3/2016 | Rougier et al. | |

* cited by examiner

SYSTEM CONFIGURED TO ASSEMBLE ONE OR MORE CABLES IN A LAYOUT

RELATED APPLICATION

This application claims priority to European Patent Application No. 16382361.0, filed Jul. 22, 2016, and is incorporated by reference in its entirety.

FIELD OF THE INVENTION

The invention is directed towards a device and method for cable assembly. The assembly of the cable follows a diagram for the layout of the cables and instructions regarding the preparation of a support surface with elements for arranging and fastening cables in the desired layout.

STATE OF THE ART

Industrial grade cabling acts as a central nervous system for many devices, such as automated devices, and particularly for electronics in transport vehicles, such aerospace vehicles including aircraft. The increase in cabling applications and new cabling technologies has resulted in cabling becoming ever more complex, which makes innovation in cabling layout design and the production techniques for cabling layouts ever more critical.

All this has contributed to generating the need to create new and improved cable assembly systems which minimize the potential of human mistakes in the assembly of cabling.

DESCRIPTION OF THE INVENTION

A device for and method of cable assembly have been invented and is disclosed here that respond to the need to develop processes that involve the least possible intervention of the operator, while at the same time enable integrating this assembly device in a plant management system for continuous production processes.

The device may be embodied as a computation device that can obtain manufacturing data from a computer aided design (CAD) system and used the data to carry out the preparation of a support surface and assembly on the same surface as the cables.

To this end, an embodiment of the invention comprises: a support surface on which cabling assembly is carried out, cable fastening and guide elements; said elements being configured to be placed on the support surface and comprising a vacuum element for joining it to said support surface, a cable feeder, computation device that comprise at least a diagram of the cabling and of the location on the support surface of the fastening elements, a storage module of fastening and cable guide elements, some positioning assembly for the fastening and guide elements and for the cabling on the support surface, said positioning assembly being configured so that they receive instructions on the location of the cable and cabling fastening and guide elements from the computation device, and comprising in turn, catching means of the cable and cabling fastening and guide elements from the storage module, means for shifting said fastening and guide elements to the location on the support surface, and means for joining the fastening and guide elements on the support surface by applying pressure against said support surface with the vacuum element.

The invention may be embodied as a method for cable assembly that includes: providing a cabling diagram and the location on a support surface of fastening and guide elements of said cables in a computation device, transmitting said diagram to some positioning assembly for the fastening and guide elements and the cabling on the support surface, catching with the positioning assembly of the fastening and guide elements from a storage module of said elements, shifting the positioning assembly to the location of the fastening and guide element, joining the fastening and guide assembly to the support surface by applying pressure with its own vacuum element against the support surface, repeating the previous steps with the rest of the fastening and guide elements, feeding the cable being assembled, catching by the cable positioning assembly, shifting the positioning assembly by the cable assembly route of the cabling diagram, feeding and assembling the rest of the cabling cables.

Advantages that may be provided by the invention include:

(a) Time and cost savings by reducing operator intervention, given that the entire process is done automatically.

(b) Possibility of integrating the cabling device into the management system of a production plant. Since it is an autonomous device, it can be included in the production process controlled by a plant manager that will control sending the information needed for carrying out the manufacturing orders.

(c) Versatility of the fastening and guide elements. As the device has a storage module available for fastening elements, it can also include fastening and guide elements for whatever cabling configuration is going to be manufactured.

(d) Reuse of the fastening and guide elements, given that they are not permanently joined to the support surface.

(e) Independent power supply. The cable for assembly will be supplied independently from the machine, and so there will not be any limit to the number and type of cables that will be introduced into the system. Any system that supplies the cable can be located so that it can be assembled, such as a commercial cable processing machine, a robot that grabs the cable of a storage system, etc.

(f) Input information. The information necessary for preparing the support surface and routing the cables to be assembled for making the cabling can be sent to the device in the programming language from the CAD design, where the integrated controller will manage the processes to be carried out, and A (g) accessibility to the work area. Once the cables are positioned, the machine leaves the work zone area free so that the subsequent operations can be carried out safely by the operators.

DETAILED DESCRIPTION OF THE INVENTION

Figure 1:
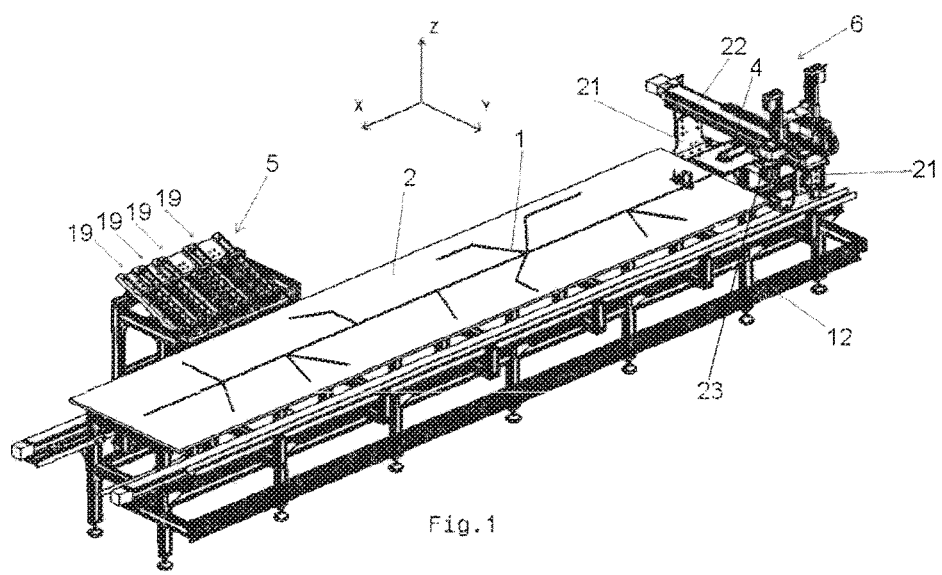
FIG. 1 is a perspective view of an example embodiment of the subject device of the invention for cable assembly.

The embodiment of the invention depicted in FIG. 1 comprises the following elements: a support surface (2) on which the cabling assembly is carried out, a cable feeder (4), a storage module (5) of the cable (1) fastening and guide elements (3), and a robotic positioning assembly (6) of the fastening and guide elements (3) on the support surface (2).

The support surface (2) is the surface on which the fastening and guide elements (3) of the cables (1) are placed and where the cables (1) are assembled for making the cabling. The support surface (2) incorporates guide trolleys for their assembly on a bench assembly (12), so that the support surface (2) can be easily moved or changed.

The bench assembly (12) is made up of standard commercial aluminum profiles and has adjustable leveling legs, leaving the work surface at an ergonomically usable height for the subsequent operations by the operators.

Figure 2:
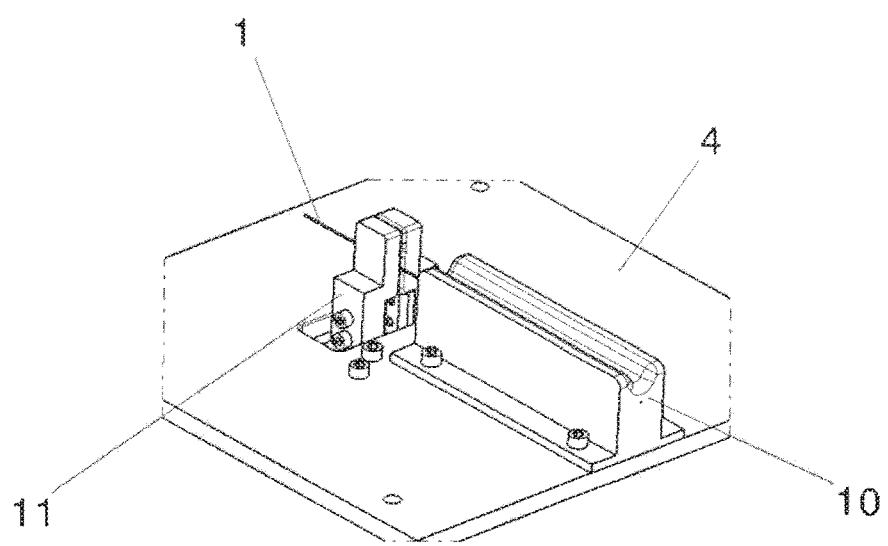
FIG. 2 is a perspective view of an example embodiment of the cable feeder.

FIG. 2 represents an embodiment of a feeder (4) of the cables (1) that are going to be assembled on the support surface (2). In the depicted example embodiment, the feeder (4) has a pneumatic clamp (11) that fixes the cable (1) until it is introduced for its assembly. It also incorporates a wedge (10) for supporting the cable (1) to facilitate guiding it.

One of the advantages of the feeder (4) of the embodiment is that any cable (1) can be introduced into said feeder (4) because the clamp (11) has a sufficient adjustable aperture, e.g., slot, to facilitate capturing the cable (1). The clamp (11) is controlled with a proportional valve that adjusts the fastening pressure.

Figure 3:
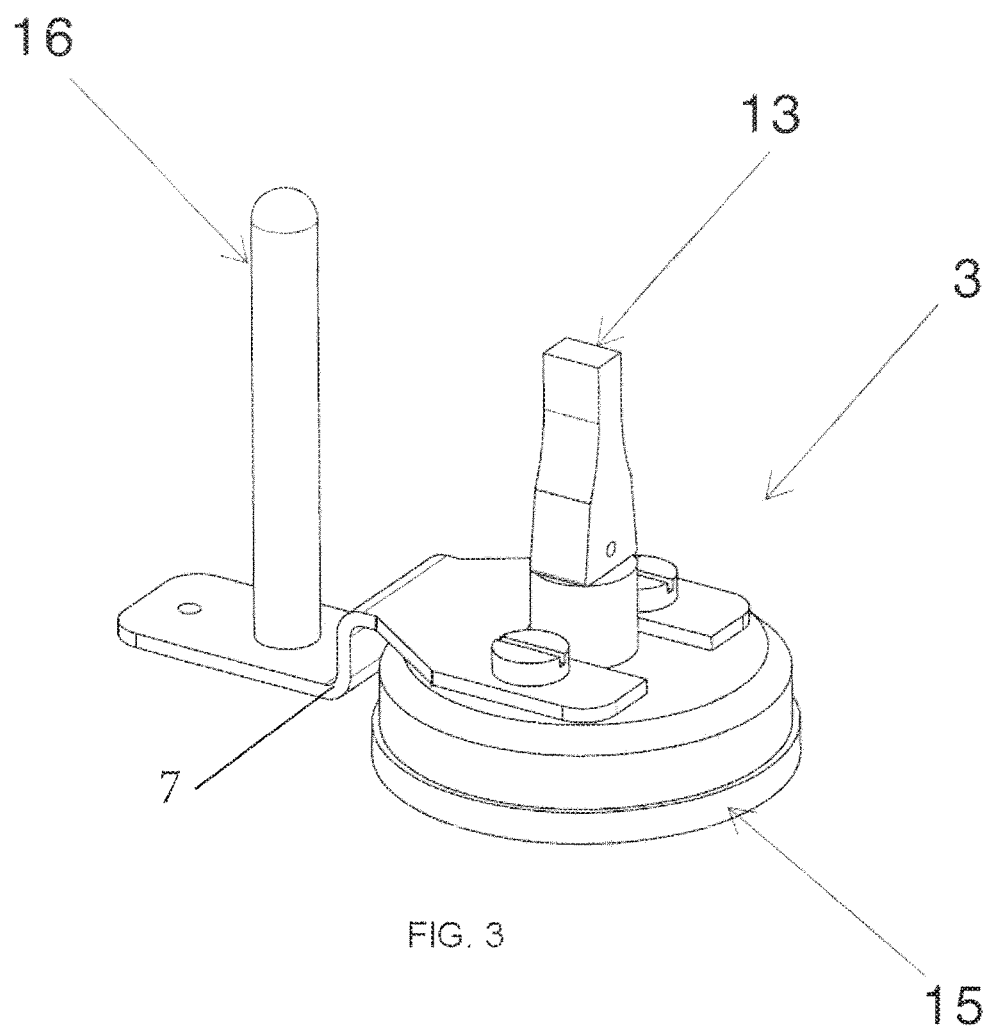
FIGS. 3 and 4 comprise a perspective view of two embodiments of a fastening and cable guide element.
Figure 4:
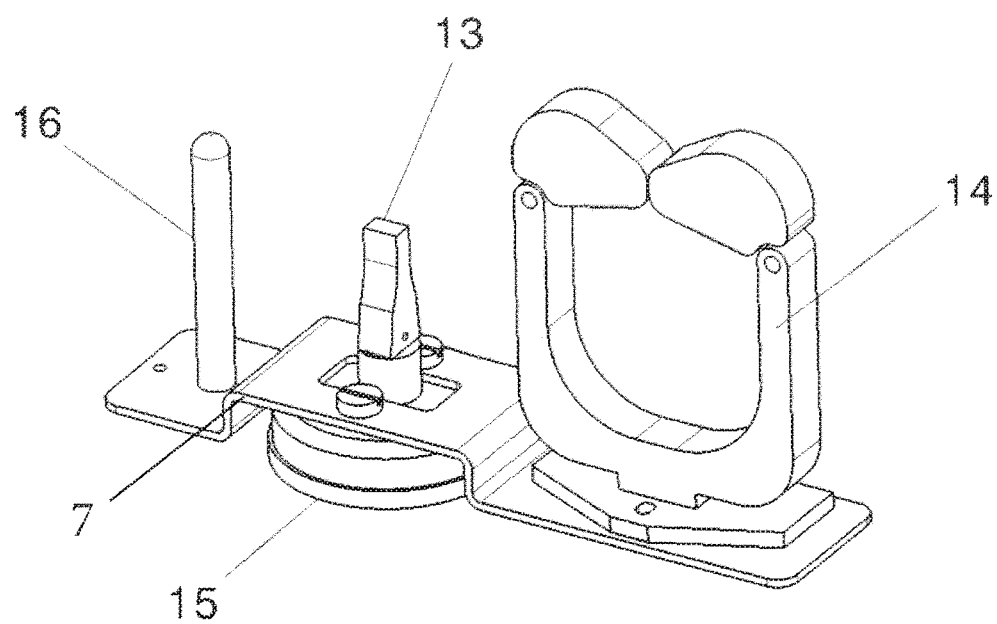
Figure 5:
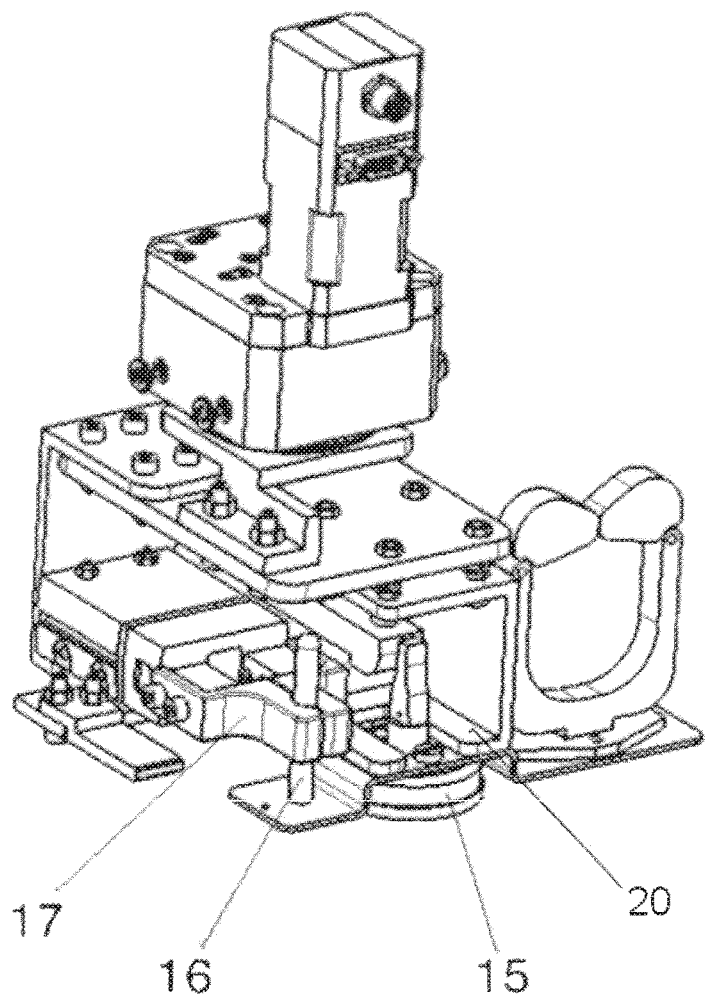
FIG. 5 is a perspective view of the positioning assembly of the fastening and guide elements, specifically of the means for applying pressure and joining said elements to the support surface.

For fastening and guiding the cables (1) on the support surface (2), the fastening and guide elements (3) are used, which can have different shapes depending on their function. The fastening and guide elements (3) of the example embodiment are divided into at least two types:

Those that guide the cables (1), see FIGS. 3 and 4. To do so, some axles (13), e.g., posts, are used, located perpendicularly to the support surface (2) and that are arranged over it (2) to be able to follow the trajectory that the cable (1) must have on the support surface (2).

Those that fasten and group the cables together (1), see FIG. 4. In the embodiment depicted, they consist in some caliper brackets (14), having a distinct diameter depending on the number of cables (1) to be grouped together.

Both the posts (13) and the caliper bracket (14) are mounted on the base of the fastening and guide elements (3) that also enable coupling a suction pad (15) with interlocking that will fix the set on the support surface (2) in a sufficient manner for carrying out the different operations for manufacturing the cabling.

The fastening and guide elements (3) further comprise an additional axle (16), e.g., additional post, so that it can apply pressure on the positioning assembly (6). A cantilever (7) supports the additional axel (post) (16) and is attached to an upper surface of the suction cup (15).

In FIG. 1, the storage module (5) is shown located in the proximity of the support surface (2), where it serves for storing the different fastening and guide elements (3) that must be placed on the support surface (2).

Figure 6:
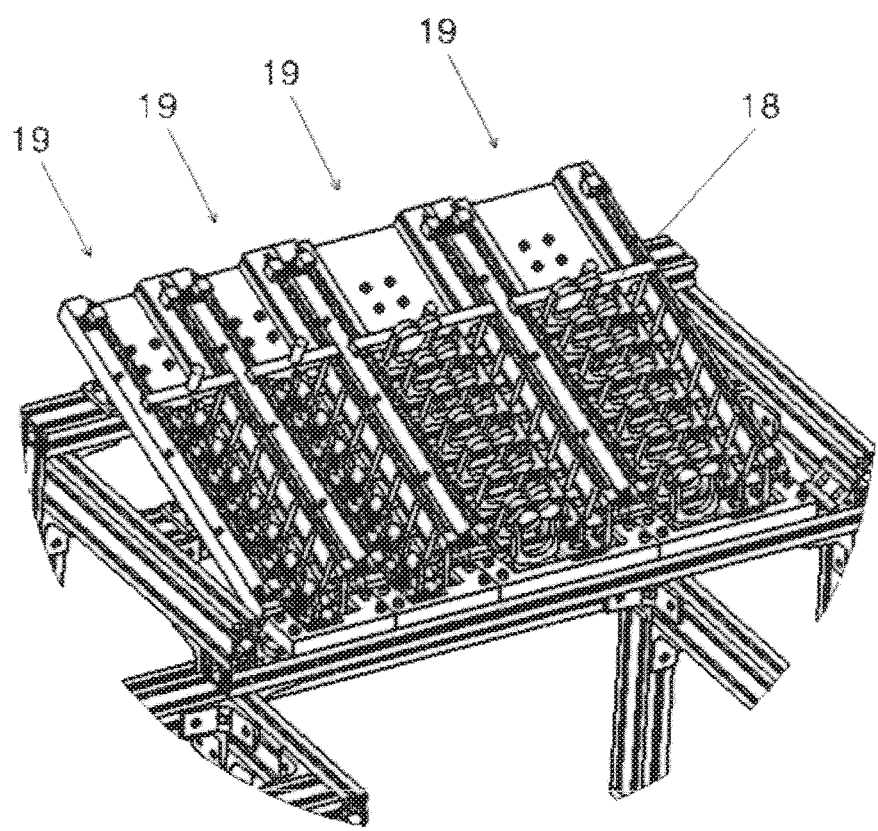
FIG. 6 is a perspective view of the storage module.

As shown in FIG. 6, the storage module (5) has specific dispensers (19) for each fastening and guide element (3), depending on its shape. The dispensers (19) are located in the storage module. In the module (5), the dispensers are inclined with respect to the horizontal. The dispensers (19) place each fastening and guide element (3), using the action of a mechanical pusher (18) comprising guide bars and the action of a spring, in the areas where they will be collected for their positioning over the support surface (2).

The subject device of the invention incorporates a system comprising different elements for catching the fastening and guide elements (3) and positioning them on the support surface (2).

A grip clamp (17) consisting in a pneumatic clamp with a parallel aperture in charge of catching the fastening and guide elements (3) by the post (16) that they have incorporated. Supports made of aluminum will be used for mounting the grip clamp (17). This grip clamp (17) also clamps the end of the cable (1) to be assembled.

The positioning assembly (6) for the fastening and guide elements (3) to the support surface (2) apply pressure on the vacuum element against said support surface (2). The system is equipped with a series of design elements for carrying out the interlocking of the vacuum element, in the example embodiment a suction cup (15) on the support surface (2). For this, it comprises a pneumatic actuator that has a head (20) coupled to it for pushing the fastening and guide elements (3) against the support surface (2), as well as supports and a set of springs for applying pressure to the suction cup (15) on the support surface (2).

Additionally, they may also comprise a rotary actuator for positioning the fastening and guide elements (3) on the support surface (2) at any angle the system requires, including an electric rotary actuator that enables the head to rotate 360°.

The means for shifting to the preset location on the support surface (2) comprise an XYZ positioning system. For the device to be able to place the fastening and guide elements (3) over the support surface (2) and assemble the cables (1), the device has servo-electric control actuators that enable moving through the X, Y, Z axes.

X Axis Actuator (21). This actuator enables positioning along the length of the longitudinal X axis of the support surface (2). The X-Axis actuator includes a linear belt module controlled by a servomotor and another linear guide module joined to the previous module by a synchronizing axle. The device comprises a cable carrying chain for driving the cables (1).

Y Axis Actuator (22). This actuator is mounted over the transversal Y axis and enables movement along the width of the support surface (2); it comprises a servo controlled linear actuator.

Z Axis Actuator (23). The device comprises two servo controlled actuators mounted on the Y axis actuator (22) for the necessary movements on the vertical Z axis that will enable bringing the fastening and guide elements (3) closer to or away from the support surface (2). The positioning systems of the fastening and guide elements (3) and the capture element of the cable (1) to be assembled will be mounted on these actuators.

The device also comprises a fastening system of the cable (1) to be assembled. This system is the one that fixes it from the feed system for carrying out the assembly over the support surface (2).

The system is further comprised of an electric actuator for the Z axis of a pneumatic clamp having a parallel aperture with two fingers having a claw shape for capturing the cable (1) regardless of the diameter.

The device further comprises a transport system of the support surface (2), with an option available to enable removing the work surface for carrying out operations somewhere else, or also to be able to put in place a new support surface (2) for manufacturing other cabling. For this, the support surface (2) is equipped over the bench assembly (12) with twin rail guides for shifting said support surface (2).

For transporting the support surface (2), a trolley is coupled to the machine to where said support surface (2) will be transported if needed. Centering devices are mounted on the trolley for positioning it in the exact position to receive the support surface (2).

As the support surface (2) is mounted on sliding guides, it has a locking system comprising safety locks to avoid the possibility of said surface (2) moving.

Finally, the device also comprises a safety system. As the machine has moving elements in areas where operators may be performing tasks, it is equipped with safety elements so that if the passageways of the moving elements are obstructed, the elements will not start working. For this, the machine mounts optical safety barriers.

In accordance with the foregoing, the device performs diverse operations. First of all, the data is entered in the computation device. Said computation device receive a file generated from a CAD design with the necessary information for the cable (1) assembly. This file must contain the following information:
   (a) Identification data of the cabling to be manufactured, such as: reference, name, number of fastening and guide elements (3), number of cables (1), etc.
   (b) Type of fastening and guide elements (3) to be placed on the work surface (2) and coordinates of the position of each one.
   (c) Input order of each cable (1) in the feeder system (4) and coordinates of the trajectory that each cable (1) is going to follow on the support surface (2).

Afterwards the system check is carried out. After the information received by the computation device is processed, the safety systems are checked, confirming that no signals are received from the safety barriers indicating the work area is not obstructed, and also that all the working elements are in the initial state.

Afterwards, the fastening and guide elements (3) are put in position. First the support surface (2) is prepared with the fastening and guide elements (3) of the cables (1) using the information sent in startup file. For this, the elements must be arranged in order and in the position established by the CAD design.

The device will perform the following steps to position the fastening and guide elements (3):

With actuators X, Y (21, 22), the grip clamp (17) is placed in the storage module (5) in front of the corresponding fastening and guide element (3)

The rotary actuator rotates the head 90 degrees and place the grip clamp (17) in front of the fastening and guide element (3).

The Z axis actuator (23) lowers the grip clamp (17) to the catch height.

With the grip clamp (17) in open position, the Y axis actuator (22) moves the clamp towards the capture position.

The grip clamp (17) closes and the Z actuator (23) raises the head.

The next fastening and guide element (3) of the storage module (5) is shifted to the capture position, moved by the weight of the rest of the fastening and guide elements (3) and by the system that pushes the springs, remaining prepared to be captured by the system if necessary.

The head with the fastening and guide element (3) on the clamp (17) is shifted by actuators X (21) and Y (22) until it is placed in the fixed coordinate; it may be rotated by the rotary actuator if necessary.

With the head placed on the correct coordinate, the Z axis actuator (23) places the fastening and guide element (3) on the support system (2).

To interlock the suction cup (15), the clamp (17) is opened and the Z axis actuator (23) lowers the head by applying pressure on the spring system, coupling the fastening and guide element (3) on the support surface (2) and absorbing the tensions. The pneumatic actuator pushes the interlocking of the suction cup (15), thereby fixing the fastening and guide element (3) to the support system (2).

These operations will be repeated until all the fastening and guide elements (3) included in the sent work order are in place.

Next the feeding of the cables (1) is carried out. The cables (1) to be assembled will be introduced into the system from the feeder area (4). The cables (1) will be arranged in the input order corresponding to the initial data sent from the CAD design. The next cable (1) to be assembled will be arranged on a guide wedge (10) and with the end between the fingers of the pneumatic clamp (11) with parallel aperture of this system; the clamp (11) will close its fingers leaving the cable (1) fixed.

Next the cable (1) assembly is carried out by executing the following operations:

The XY actuators (21, 22) position the positioning assembly (6), specifically the assembly head, on the initial clamp (17) that fixes the cable (1) to be introduced into the system.

The Z actuator (23) lowers the head for positioning the assembly clamp (17) opened for receiving the cable, and once it is in position it closes the clamp (17).

The actuators XY (21, 22) move the assembly head with the cable (1) fixed through the trajectory corresponding to the initial data for inserting the cable (1) in the fastening and guide elements (3). Once the head passes over the fastening and guide element (3) it is lowered with the Z actuator (23), while at the same time the initial clamp (17) closes to tighten the cable (1) and to be able to overcome the lock that the caliper bracket (14) has ready for fixing it. The caliper bracket (14) has a U shaped body and articulated elements joined to the legs of the U that close the bracket at its top part and that pivot to enable the clamp (17) to enter.

These operations will be repeated for each cable (1) that has to be assembled on the support surface (2).

After all the cables (1) have been assembled in accordance with the work order sent, the XY actuators (21, 22) will position the heads in the parking area. The parking area is located over the feeder system (4) leaving the entire work surface free.

If the work surface needs to be moved, the following series of operations must be carried out:

Position the transport trolley next to the machine for inserting the centering devices mounted on the trolley in the housing located on the bench assembly to ensure the guides are correctly aligned.

Open the safety locks of the machine to enable moving the surface, and shift it towards the trolley.

Once the surface is mounted on the trolley, secure it by closing the safety locks mounted on the trolley The work surface can be quickly and easily removed from machine to be able to carry out operating tasks on the cabling mounted on it separately from the machine. A new surface may be mounted so that the machine can assemble a new cabling.

The cable fastening elements are mounted on the surface with suction cups (15), which means that once the cabling has been produced, all the elements mounted on the surface can be disassembled easily, leaving the surface clean and free of imperfections for starting the assembly of another work order.

The invention may be embodied as a device for cable (1) assembly for making cabling comprising: a support surface (2) on which the cable assembly is carried out (1), fastening and guide elements (3) of the cables (1), said fastening and guide elements (3) being configured to be placed over the support surface (2) and comprising a vacuum element for joining it to said support surface (2), a feeder (4) of the cable (1) to be assembled, some computation device that comprise a cabling diagram in its memory and the location of the fastening and guide elements (3) on the support surface (2), a storage module (5) for the fastening and guide elements (3) of the cables (1), positioning assembly (6) for the fastening and guide elements (3) of the cables (1) over the support surface (2), said positioning assembly (6) being configured such that it receives instructions from the computation device on the location of the guide and fastening elements (3) and of the cabling, the positioning assembly (6) comprising a catching device for the cable fastening and guide elements (3) from the storage module (5), shifting means to the location on the support surface (2) of said fastening and guide elements (3) and joining means for the fastening and guide elements (3) over the support surface (2) by pressing the vacuum pressure element against said support surface (2).

The fastening and guide elements (3) may comprise a post (13) configured for being located perpendicularly to the support surface (2) and for guiding the trajectory of the cable (1) on the support surface (2). Further, the fastening and guide elements (3) may include a caliper bracket (14) for grouping together a set of cables (1). Moreover, the fastening and guide elements (3) may comprise an additional axis (16) for enabling the positioning assembly (6) to catch them.

The catching the fastening and guide elements (3) and positioning them on the support surface (2); the positioning assembly (6) may comprise: a gripping clamp (17) of the fastening and guide elements (3) for the additional axis (16), and means for fastening the fastening and guide elements (3) to the support surface (2) that comprise a pneumatic actuator coupled to a head (20) for pushing the fastening and guide elements (3) against the support surface (2).

The positioning assembly (6) may comprise a rotary actuator for rotating it.

The storage module (5) may have specific dispensers (19) for each type of fastening and guide element (3), depending on its shape.

The vacuum element of the fastening and guide elements (3) may include a suction cup (15).

The invention may be embodied as method for assembling cables (1) comprising: providing a cabling diagram and the location on a support surface (2) of fastening and guide elements (3) of said cables (1) in computation device, transmitting said diagram to positioning assembly (6) of the fastening and guide elements (3) and of the cabling on the support surface (2), latching with the positioning assembly (6) of the fastening and guide elements (3) from a storage module (5) of said fastening and guide elements (3), shifting the positioning assembly (6) to the location of the fastening and guide element (3), joining the fastening and guide elements (3) to the support surface (2) with the vacuum pressure element of said fastening and guide elements (3) on the support surface (2), repeating the previous steps with the rest of the fastening and guide elements (3), feeding the cable (1) to be assembled, catching with the positioning assembly (6) of the end of the cable (1), shifting the positioning assembly (6) along the cable (1) assembly route of the cabling diagram, and feeding and assembling the rest of the cabling cables (1).

The invention may also be embodied as a device for cable (1) assembly for making cabling, comprising: a support surface (2) on which the cable assembly is carried out (1), fastening and guide elements (3) of the cables (1), said fastening and guide elements (3) being configured to be placed over the support surface (2) and comprising a vacuum element for joining it to said support surface (2), a feeder (4) of the cable (1) to be assembled, some computation means that comprise a cabling diagram in its memory and the location of the fastening and guide elements (3) on the support surface (2), a storage module (5) for the fastening and guide elements (3) of the cables (1), positioning means (6) for the fastening and guide elements (3) of the cables (1) over the support surface (2), said positioning means (6) being configured such that it receives instructions from the computation means on the location of the guide and fastening elements (3) and of the cabling, the positioning means (6) comprising catching means for the cable fastening and guide elements (3) from the storage module (5), shifting means to the location on the support surface (2) of said fastening and guide elements (3) and joining means for the fastening and guide elements (3) over the support surface (2) by pressing the vacuum pressure element against said support surface (2).

The fastening and guide elements (3) may comprise an axle (post) (13) configured for being located perpendicularly to the support surface (2) and for guiding the trajectory of the cable (1) on the support surface (2). The fastening and guide elements (3) may include a caliper bracket (14) for grouping together a set of cables (1). The fastening and guide elements (3) comprise an additional axle (post) (16) for enabling the positioning means (6) to catch them.

The catching means may include a gripping clamp (17) of the fastening and guide elements (3) for the additional axis (16), and means for fastening the fastening and guide elements (3) to the support surface (2) that comprise a pneumatic actuator coupled to a head (20) for pushing the fastening and guide elements (3) against the support surface (2).

The positioning means (6) may comprise a rotary actuator for rotating it.

The storage module (5) may have specific dispensers (19) for each type of fastening and guide element (3), depending on its shape.

The vacuum element of the fastening and guide elements (3) may include a suction cup (15).

The invention may be embodied as a method for assembling cables (1) that comprises the following steps: providing a cabling diagram and the location on a support surface (2) of fastening and guide elements (3) of said cables (1) in computation means, transmitting said diagram to positioning means (6) of the fastening and guide elements (3) and of the cabling on the support surface (2), catching with the positioning means (6) of the fastening and guide elements (3) from a storage module (5) of said fastening and guide elements (3), shifting the positioning means (6) to the location of the fastening and guide element (3), joining the fastening and guide elements (3) to the support surface (2) with the vacuum pressure element of said fastening and guide elements (3) on the support surface (2), repeating the previous steps with the rest of the fastening and guide elements (3), feeding the cable (1) to be assembled, catching with the positioning means (6) of the end of the cable (1), shifting the positioning means (6) along the cable (1) assembly route of the cabling diagram, feeding and assembling the rest of the cabling cables (1).

The invention may be embodied as system configured to arrange cables into a prescribed layout for the cables, the system comprising: a horizontal support surface; a storage module adjacent the horizontal support surface, wherein the storage module is configured to temporarily hold fastening and guide elements, the fastening and guide elements are each configured to guide cables or group cables together, and the fastening and guide elements each include a vacuum element configured to be attached to the support surface; a cable feeder adjacent the horizontal support surface; a robotic positioning device configured to position the fastening and guide elements on the support surface, said positioning assembly configured to receive and execute instructions from a computer controller, wherein the positioning assembly includes: a catching device configured to retrieve the fastening and guide elements from the storage module, a shifting device configured to move the cable fastening and guide elements from the storage module to their corresponding desired positions, and a joining device configured to press each of the plurality of the fastening and guide elements on the support surface such that a vacuum pressure element of each of the fastening and guide elements is pressed against said support surface, wherein the computer controller is configured to generate control instructions which cause the robotic positioning assembly to automatically: (a) grasp a selected fastening and guide element from the fastening and guide elements in the storage module; (b) move the selected fastening and guide element from the storage module to a location on the support surface; (c) attach the selected fastening and guide element to the support surface at the location by applying the vacuum pressure element of the selected fastening and guide element to the support surface; (d) repeat steps a to d for successive selected fastening and guide elements.

The computer controller may further causes the robotic positioning assembly to grasps an end region of a cable at the cable feeder, pulls the cable over the support surface and positions the cable along a path conforming to a cable layout retrieved from the controller from electronic storage. The robotic positioning assembly may grasp the end region of the cable after steps a to d have been performed to attached the selected fastening and guide elements to the support surface. The robotic positioning assembly may position the cable into engagement with the selected fastening and guide elements while positioning the cable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A system configured to assemble one or more cables in a layout, the system comprising:
 a horizontal support surface on which cable assembly is to be carried out;
 fastening and guide elements for the one or more- cables, said fastening and guide elements are each configured to be attached to the support surface at selected positions on the support surface, and the fastening and guide elements each comprise a vacuum element configured to be attached to the support surface, a single post extending upward from the vacuum element, and a second post offset from the vacuum element and connected to the vacuum element by a cantilever, wherein the first post is configured to guide the one or more cables through a turn;
 a feeder of cable configured to be assembled on the support surface;
 a computation device configured to access a cabling layout diagram and information indicating the selected positions of the fastening and guide elements on the support surface;
 a storage module configured to store the fastening and guide elements; and
 a positioning assembly configured to position the fastening and guide elements on the support surface, said positioning assembly configured to receive instructions from the computation device identifying the selected positions on the support surface for each of the guide and fastening elements in the storage module, and a selected location on the support surface for the cable fed from the feeder;
 wherein the positioning assembly includes:
  a grip clamp configured to grip the second post of a selected one of the fastening and guide elements from the storage module;
  an actuator configured to move the grip clamp while gripping the second post of the selected fastening and guide element from the storage module to one of the selected positions which corresponds to the selected fastening and guide element; and
  a pneumatic actuator configured to press the selected one of the fastening and guide elements on the support surface such that the vacuum pressure element of the selected one of the fastening and guide elements is pressed against said support surface.

2. The system according to claim 1, wherein ft the fastening and guide elements include a caliper bracket configured to group grouping together cables.

3. The system according to claim 1, wherein the joining device includes a pneumatic actuator configured to push each of the plurality of the fastening and guide elements against the support surface.

4. The system according to claim 3, wherein the positioning assembly includes a rotary actuator configured to rotate the positioning assembly.

5. The system according to claim 1, wherein the storage module includes dispensers for each type of the fastening and guide elements.

6. The system according to claim 1, wherein the vacuum element includes a suction cup.

7. A system configured to arrange cables into a prescribed layout for the cables, the system comprising:
 a horizontal support surface;
 a storage module adjacent the horizontal support surface, wherein the storage module is configured to temporarily hold fastening and guide elements:
 the fastening and guide elements are each configured to guide cables or group cables together, and the fastening and guide elements each include:

a vacuum element having a first surface configured to be attached by suction to the support surface, and a second surface opposite to the first surface;

a single first post upstanding from the first surface configured to guide the one or more cables through a turn;

a cantilever including a first arm attached to the second surface and a second arm, offset in a horizontal direction from the vacuum element configured to be adjacent the horizontal support surface; and a second post mounted to and upstanding from the second arm of the cantilever, wherein the second post is offset from the vacuum element in the horizontal direction;

a cable feeder adjacent the horizontal support surface;

a robotic positioning device configured to position the fastening and guide elements on the support surface, said robotic positioning device configured to receive and execute instructions from a computer controller, wherein the robotic positioning device includes:

a grip clamp configured to retrieve a selected one of the fastening and guide elements from the storage module by gripping the second post on the selected one of the fastening and guide element;

an actuator configured to move the selected one of the cable fastening and guide elements from the storage module to a position on the horizontal support surface by moving the grip clamp while gripping the second post on the selected fastening and guide element; and a pneumatic actuator configured to press the selected one of the fastening and guide elements on the horizontal support surface such that the vacuum pressure element of the selected fastening and guide element is pressed against said horizontal support surface, the computer controller configured to generate control instructions which cause the robotic positioning device to:

a. actuate the grip clamp to grip the second post of the selected one of the fastening and guide elements from the fastening and guide elements in the storage module;

b. actuate the actuator to move the grip clamp while gripping the second post of the selected one of the fastening and guide elements from the storage module to a location on the horizontal support surface;

c. actuate the pneumatic actuator to attach the first surface of the vacuum element of the selected one of the fastening and guide elements to the support surface at the location by forming a applying the vacuum between the vacuum element and the horizontal support surface;

d. repeating steps a to c for successive selected ones of the fastening and guide elements.

8. The system of claim 7 wherein the computer controller causes the robotic positioning device to automatically perform steps a to d.

9. The system of claim 7 wherein the computer controller further causes the robotic positioning device to grasps an end region of a cable at the cable feeder, pulls the cable over the support surface and positions the cable along a path conforming to a cable layout retrieved an electronic storage accessed by the controller.

10. The system of claim 9 wherein the robotic positioning device grasps the end region of the cable after steps a to d are performed to attached the selected fastening and guide elements to the support surface.

11. The system of claim 10 wherein the robotic positioning device positions the cable into engagement with the selected fastening and guide elements while positioning the cable.

* * * * *